United States Patent [19]

Yoon

[11] Patent Number: 5,648,880
[45] Date of Patent: Jul. 15, 1997

[54] VIDEO CASSETTE PLAYER WITH ROTARY DRUM ROTATED BY A CAPSTAN MOTOR

[75] Inventor: Hee-Sung Yoon, Seoul, Rep. of Korea

[73] Assignee: Daewoo Electronics Co., Ltd., Seoul, Rep. of Korea

[21] Appl. No.: 585,073

[22] Filed: Jan. 11, 1996

[30] Foreign Application Priority Data

Mar. 29, 1995 [KR] Rep. of Korea .................. 95-5863

[51] Int. Cl.⁶ .................. G11B 15/28; G11B 5/52
[52] U.S. Cl. .................. 360/96.4; 360/85; 242/356; 242/356.7
[58] Field of Search .................. 360/84, 85, 93, 360/95, 96.1, 96.3, 96.4, 105, 137, 107; 242/356, 356.3–356.6, 356.7

[56] References Cited

U.S. PATENT DOCUMENTS

| | | | |
|---|---|---|---|
| 4,964,589 | 10/1990 | Okada | 360/96.3 |
| 5,003,418 | 3/1991 | Yang | 360/96.4 |
| 5,151,832 | 9/1992 | Nagasawa | 360/95 |
| 5,295,639 | 3/1994 | Kurokawa et al. | 360/96.3 |
| 5,428,488 | 6/1995 | Lee | 360/84 |
| 5,472,151 | 12/1995 | Choi et al. | 242/356.4 |
| 5,486,958 | 1/1996 | Choi et al. | 360/85 |
| 5,499,777 | 3/1996 | Ahn | 242/356 |
| 5,511,738 | 4/1996 | Seo et al. | 242/356 |
| 5,517,370 | 5/1996 | Tanaka | 360/70 |
| 5,535,957 | 7/1996 | Shin | 242/355.1 |

*Primary Examiner*—Jefferson Evans
*Attorney, Agent, or Firm*—Pennie & Edmonds LLP

[57] ABSTRACT

A video cassette player includes a main base, a head drum assembly including a rotary drum, a stationary drum, a rotating shaft and a driven gear pressed on and fixed to a lower end portion of the rotating shaft, a capstan motor provided with a capstan shaft, a driving pulley fixed to a lower end portion of the capstan shaft, an idler assembly provided with a bracket, a hinge shaft, an idle gear, an intermediate gear and a first driven pulley, a driving assembly including a shaft, a driving gear and a second driven pulley, and a first and a second belts. The shaft of the driving gear assembly is rotatably fixed to the main base, and the driving gear and the second driven pulley are, in turn, fixed to a lower portion of the shaft, the driving gear being engaged with the driven gear of the head drum assembly. The first and second driven pulleys are coupled to and rotated simultaneously by the driving pulley through the first and the second belts, respectively, so that the rotary drum as well as the idle gear are rotated by the capstan motor.

4 Claims, 3 Drawing Sheets

VIDEO CASSETTE PLAYER WITH ROTARY DRUM ROTATED BY A CAPSTAN MOTOR

FIELD OF THE INVENTION

The present invention relates to a video cassette player ("VCP"); and, more particularly, to an improved video cassette player capable of allowing a rotary drum of a head drum assembly incorporated therein to be rotated by a capstan motor.

DESCRIPTION OF THE PRIOR ART

There is shown in FIG. 1 a schematic plan view of a conventional VCP which does not have a recording function. The VCP comprises a head drum assembly 1 including a rotary drum 1a, a stationary drum 1b, a drum motor (not shown) and a rotating shaft 1c, a supply reel table 2, a take-up reel table 3, a capstan motor 6 provided with a capstan shaft 4, a driving pulley 9, an idler assembly 7 provided with a driven pulley 8, an idle gear 7a and an intermediate gear 7b, a belt 10 and a main base 5.

The drum motor is normally installed to a lower portion of the rotating shaft 1c and rotates the rotary drum 1a.

In the conventional VCP, during a play mode, the rotary drum 1a of the head drum assembly 1 is rotated at about 1800 rpm, and the capstan shaft 4 is rotated by the capstan motor 6 at one tenth the rotational speed of the rotary drum 1a, i.e., about 180 rpm.

On the other hand, the driving pulley 9 is fixed to a lower portion of the capstan shaft 4 and transmits the rotational force of the capstan motor 6 to the driven pulley 8 through the belt 10.

The idle gear 7a is rotated by the driven pulley through the intermediate gear 7b, being selectively engaged with either the supply reel table 2 or the take-up reel table 3 depending on a rotational direction of the capstan motor 6. When the capstan motor 6 rotates in a forward direction, the idle gear 7a is engaged with the take-up reel table 3 and rotates it.

However, in such a conventional VCP, the drum motor as well as the capstan motor 6 are required for the VCP to fulfill its intended function, resulting in an increase of the production cost thereof.

SUMMARY OF THE INVENTION

It is, therefore, a primary object of the invention to provide a VCP capable of allowing a head drum assembly incorporated therein to be rotated by a capstan motor, to thereby decrease the production cost thereof.

In accordance with one aspect of the present invention, there is provided a VCP comprising: a main base; a head drum assembly mounted to the main base, the head drum assembly including a rotary drum, a stationary drum, a rotating shaft and a driven gear, wherein the rotary drum and the driven gear are fixed to upper and lower portion of the rotating shaft, respectively, and rotating therewith; a capstan motor provided with a capstan shaft, the capstan motor mounted on the main base such that the capstan shaft is rotatable; a driving pulley fixed to the capstan shaft, rotating therewith; supply and take-up reel tables rotatably mounted on the main base; an idler assembly provided with a bracket, a hinge shaft, an idle gear, an intermediate gear and a first driven pulley, wherein the hinge shaft is mounted to the main base, the first driven pulley and the intermediate gear are, in turn, secured to the hinge shaft, one end portion of the bracket is pivotably fixed to the hinge shaft, the idle gear is rotatably fixed to the other end portion of the bracket, engaged with and rotated through the intermediate gear in response to a rotation of the first driven pulley, and the idle gear is engaged with either the supply reel table or the take-up reel table depending on a rotational direction of the capstan motor; a driving gear assembly including a shaft, a driving gear and a second driven pulley, wherein the shaft is rotatably fixed to the main base, the driving gear and the second driven pulley are, in turn, fixed to the shaft, the driving gear being engaged with the driven gear of the head drum assembly; and first and second belts for simultaneously transmitting a rotational force of the capstan motor to the first driven pulley and the second driven pulley, the first belt coupling the driving pulley and the first driven pulley, and the second belt coupling the driving pulley and the second driven pulley.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
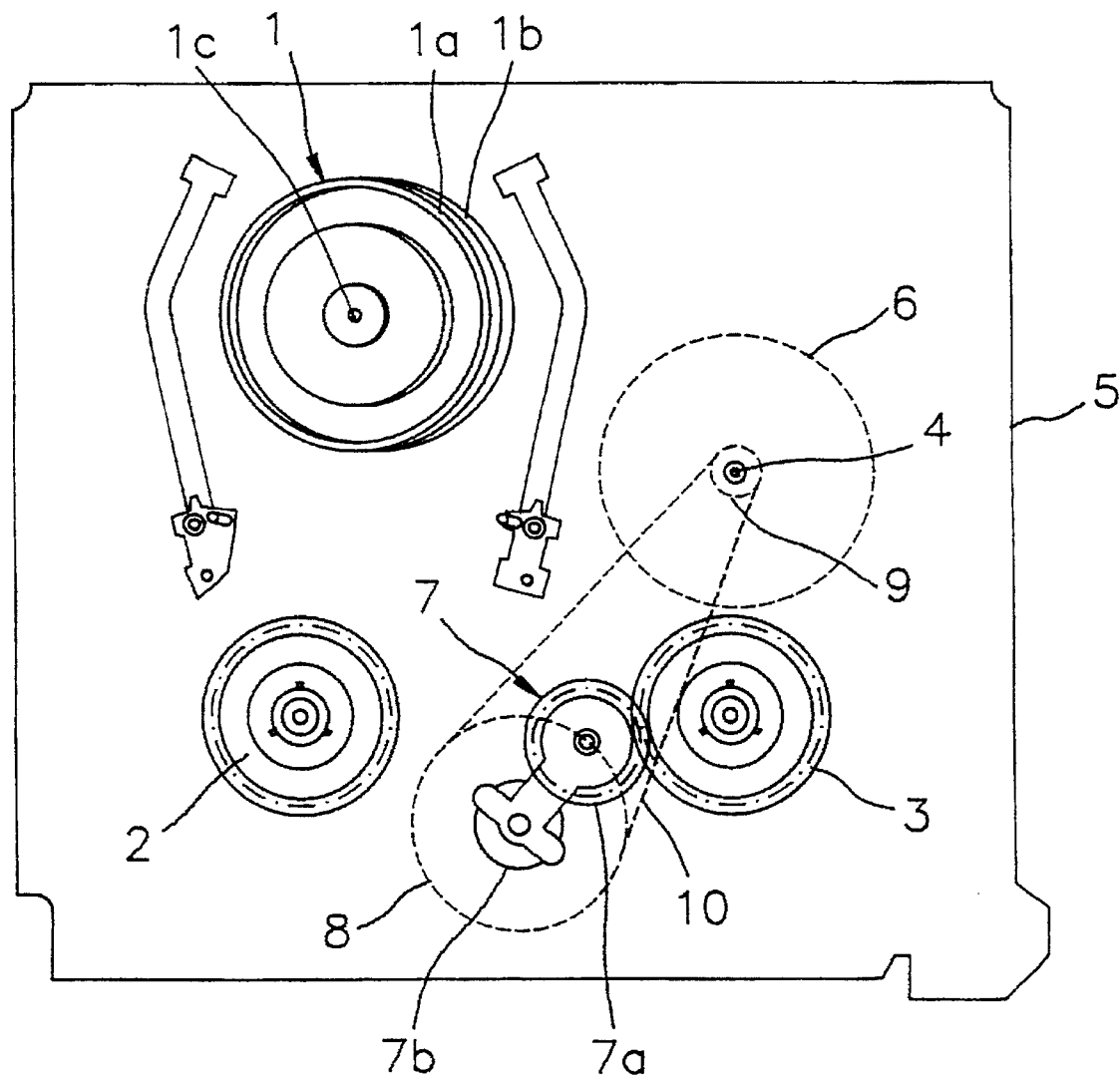
FIG. 1 shows a schematic top view of a conventional VCP.
Figure 2:
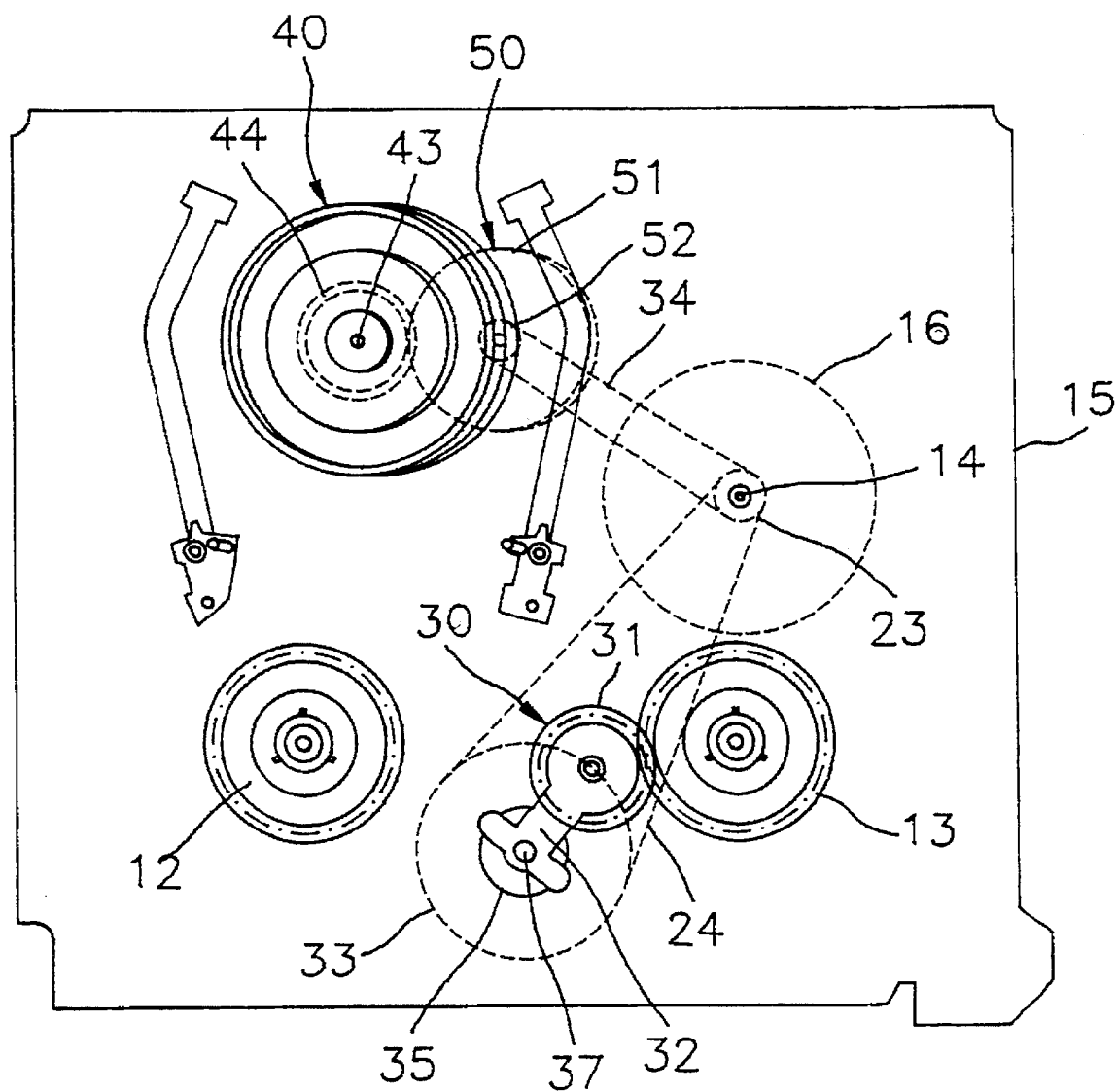
FIG. 2 represents a schematic top view of a VCP of the present invention.

There is shown in FIG. 2 a schematic top view of a preferred embodiment of the VCP in accordance with the present invention. The inventive VCP comprises a head drum assembly 40, a driving gear assembly 50, a supply reel table 12, a take-up reel table 13, a capstan motor 16 provided with a capstan shaft 14, a driving pulley 23, an idler assembly 30 provided with a hinge shaft 37, a bracket 32, an idle gear 31, an intermediate gear 35 and a first driven pulley 33, a first and a second belts 24, 34, and a main base 15.

The capstan motor 16 is secured to the main base 15 such that the capstan shaft 14 is rotatable.

The driving pulley 23 is fixed to a lower portion of the capstan shaft 14 and rotates therewith.

The supply and the take-up reel tables 12, 13 are rotatably mounted on the main base 15.

The idler assembly 30 is disposed between the supply and the take-up reel tables 12, 13. The hinge shaft 37 of the idler assembly 30 is fixed to the main base 15 and the first driven pulley 33 and the intermediate gear 35 are, in turn, rotatably fixed to the hinge shaft 37. The first driven pulley is coupled to and rotated by the driving pulley 23 through the first belt 24. One end portion of the bracket 32 is pivotably mounted to the hinge shaft 37 and the idle gear 31 is rotatably fixed to the other end portion of the bracket 32 and engaged with the intermediate gear 35. The bracket 32 is pivoted depending on a rotational direction of the capstan motor 16 so that the idle gear 31 is selectively engaged with either the supply reel table 12 or the take-up reel table 13.

Figure 3:
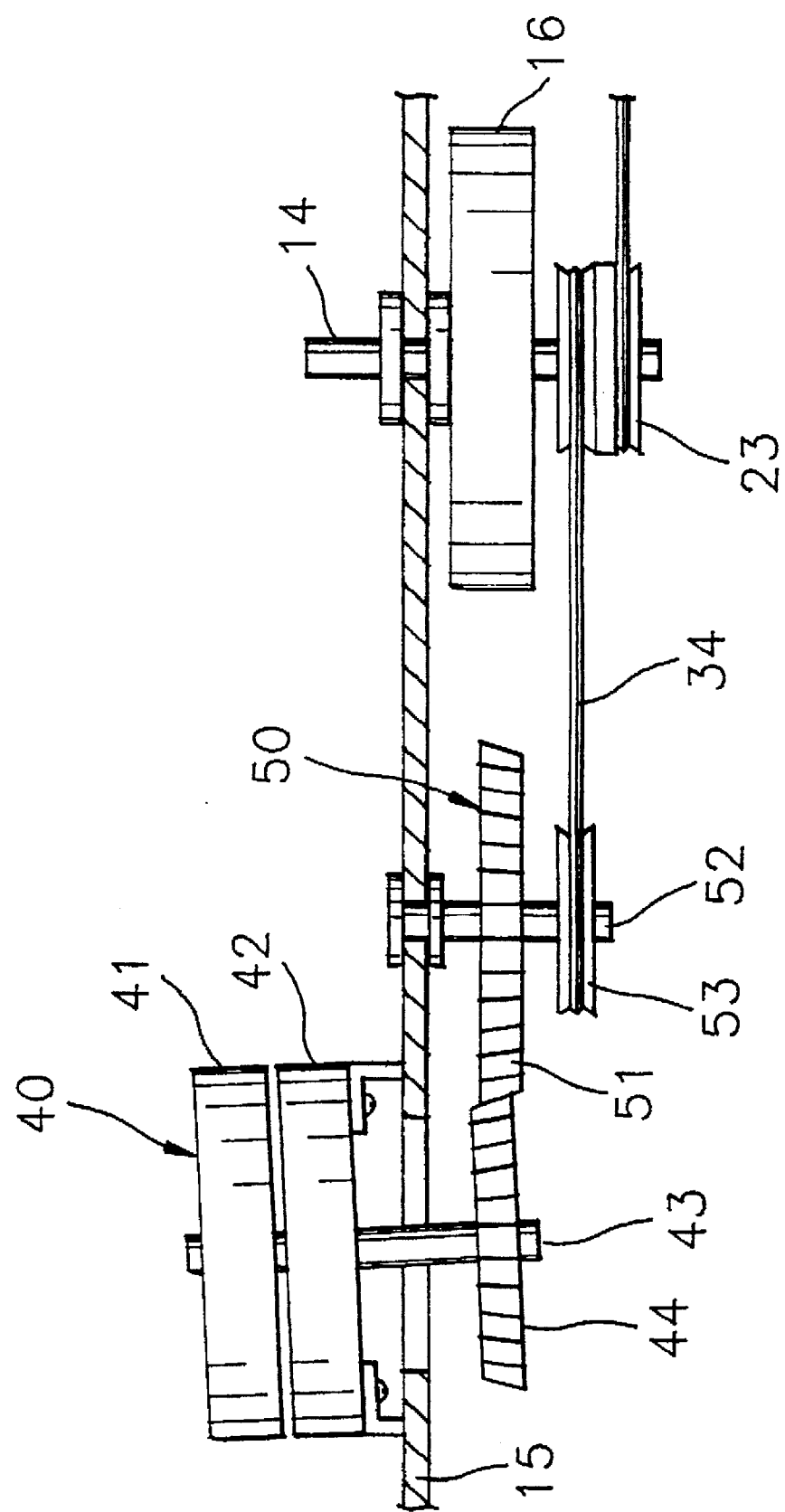
FIG. 3 illustrates a partial sectional view of the VCP shown in FIG. 2, displaying the head drum assembly, the driving gear assembly and the capstan motor, and the coupling structure thereof.

On the other hand, as further shown in FIG. 3, the head drum assembly 40, fixed to the main base 15, includes a rotary drum 41, a stationary drum 42, a rotating shaft 43 and a driven gear 44. The rotary drum 41 and the driven gear 44 are fixed to an upper and a lower portions of the rotating shaft 43, respectively, and rotating therewith.

Furthermore, the driving gear assembly 50 includes a driving gear 51, a shaft 52 and a second driven pulley 53. The shaft 52 is rotatably mounted to the main base 15 using an appropriate fastening means. The driving gear 51 and the second driven pulley 53 are, in turn, secured to the shaft 52, and they are integrally rotated. The second driven pulley 53 is also coupled to the driving pulley 23 through the second belt 34. The driving gear 51 is engaged with the driven gear 44 of the head drum assembly 40.

It is preferable that the driving pulley 23 and the second driven pulley 53 have a same diameter and the driving gear 51 and the driven gear 44 have a speed ratio of 1:10, thereby allowing the rotary drum 41 to rotate at ten times the rotational speed of the capstan motor 16.

Furthermore, since the rotating shaft 43 of the head drum assembly 40 is slanted with respect to the shaft 52 of the driving gear assembly 50, it is preferable that the driving and the driven gears 51 and 44 form bevel gears, as illustrated.

Operation of the inventive VCP of the present invention will now be described.

When the capstan motor 16 rotates in a forward direction, the driving pulley 23 rotates simultaneously with the first and the second driven pulleys 33 and 53 through the first and the second belts 24 and 34, respectively.

The idle gear 31 is rotated through the intermediate gear 35 in response to the rotation of the first driven pulley 33, engaging and rotating the take-up reel table 13.

On the other hand, the driving gear 50 and the driven gear 44 are, in turn, rotated in response to the rotation of the second driven pulley 53, resulting in a rotation of the rotary drum 41.

The rotational speed of the rotary drum 41 may be determined by the rotational speed of the capstan motor 16, a diameter ratio of the driving pulley 23 to the second driven pulley 53 and a speed ratio of the driving gear 51 to the driven gear 44. For example, when the capstan motor 16 rotates at about 180 rpm, if the driving pulley 23 and the second driven pulley 53 have a same diameter and the driving gear 51 and the driven gear have a speed ratio of 1:10, the rotary drum 41 will rotate at about 1800 rpm, thereby allowing the inventive VCP to perform the reproduction function.

In other words, in the inventive VCP, the rotation of the rotary drum 41 can be achieved by means of only the capstan motor 16, i.e., without employing therein a drum motor as in the conventional VCP, thereby decreasing the production cost thereof.

Although the invention has been shown and described with respect to the preferred embodiments, it will be understood by those skilled in the art that various changes and modifications may be made without departing from the spirit and scope of the invention as defined in the following claims.

What is claimed is:

1. A video cassette player comprising:

a main base;

a head drum assembly mounted to the main base, the head drum assembly including a rotary drum, a stationary drum, a rotating shaft and a driven gear, wherein the rotary drum and the driven gear are fixed to upper and lower portion of the rotating shaft, respectively, and rotating therewith;

a capstan motor provided with a capstan shaft, the capstan motor mounted on the main base such that the capstan shaft is rotatable;

a driving pulley fixed to the capstan shaft, rotating therewith;

supply and take-up reel tables rotatably mounted on the main base;

an idler assembly provided with a bracket, a hinge shaft, an idle gear, an intermediate gear and a first driven pulley, wherein the hinge shaft is mounted to the main base, the first driven pulley and the intermediate gear are, in turn, secured to the hinge shaft, one end portion of the bracket is pivotably fixed to the hinge shaft, the idle gear is rotatably fixed to the other end portion of the bracket, engaged with and rotated through the intermediate gear in response to a rotation of the first driven pulley, and the idle gear is engaged with either the supply reel table or the take-up reel table depending on a rotational direction of the capstan motor;

a driving gear assembly including a shaft, a driving gear and a second driven pulley, wherein the shaft is rotatably fixed to the main base, the driving gear and the second driven pulley are, in turn, fixed to the shaft, the driving gear being engaged with the driven gear of the head drum assembly; and first and second belts for simultaneously transmitting a rotational force of the capstan motor to the first driven pulley and the second driven pulley, the first belt coupling the driving pulley and the first driven pulley, the second belt coupling the driving pulley and the second driven pulley.

2. The video cassette player of claim 1, wherein the driving gear and the driven gear form bevel gears.

3. The video cassette player of claim 2, wherein the driving pulley and the second driven pulley have the same diameter and the driving gear and the driven gear have a speed ratio of 1:10.

4. The video cassette player of claim 1, wherein the driving pulley and the second driven pulley have the same diameter and the driving gear and the driven gear have a speed ratio of 1:10.

* * * * *